US012391044B2

(12) United States Patent
Cumbie et al.

(10) Patent No.: US 12,391,044 B2
(45) Date of Patent: Aug. 19, 2025

(54) FLUID EJECTION DEVICE WITH BREAK(S) IN COVER LAYER

(71) Applicant: Hewlett-Packard Development Company, L.P., Spring, TX (US)

(72) Inventors: Michael W. Cumbie, Corvallis, OR (US); Anthony M. Fuller, Corvallis, OR (US); Chien-Hua Chen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 178 days.

(21) Appl. No.: 18/222,369

(22) Filed: Jul. 14, 2023

(65) Prior Publication Data

US 2023/0356527 A1 Nov. 9, 2023

Related U.S. Application Data

(63) Continuation of application No. 17/311,593, filed as application No. PCT/US2019/029620 on Apr. 29, 2019, now Pat. No. 11,745,507.

(51) Int. Cl.
*B41J 2/14* (2006.01)
*B41J 2/16* (2006.01)

(52) U.S. Cl.
CPC ............. *B41J 2/1433* (2013.01); *B41J 2/162* (2013.01); *B41J 2/1637* (2013.01)

(58) Field of Classification Search
CPC ......... B41J 2/1433; B41J 2/162; B41J 2/1637
See application file for complete search history.

(56) References Cited

U.S. PATENT DOCUMENTS

| | | | |
|---|---|---|---|
| 5,515,089 | A | 5/1996 | Herko et al. |
| 5,889,539 | A | 3/1999 | Kamoi et al. |
| 6,922,203 | B2 | 7/2005 | Giere et al. |
| 6,953,891 | B2 | 10/2005 | Bolken et al. |
| 7,845,763 | B2 | 12/2010 | Keshishian et al. |
| 9,159,686 | B2 | 10/2015 | Chen et al. |
| 2002/0101485 | A1 | 8/2002 | Liu et al. |
| 2002/0167567 | A1 | 11/2002 | Saito et al. |
| 2004/0031150 | A1 | 2/2004 | Silverbrook |
| 2005/0134646 | A1 | 6/2005 | Huang et al. |
| 2009/0128604 | A1 | 5/2009 | Silverbrook |
| 2009/0255629 | A1 | 10/2009 | Gibson et al. |

(Continued)

FOREIGN PATENT DOCUMENTS

| | | | |
|---|---|---|---|
| CN | 101065855 | A | 10/2007 |
| CN | 102673155 | A | 9/2012 |

(Continued)

*Primary Examiner* — Jason S Uhlenhake
(74) *Attorney, Agent, or Firm* — Foley & Lardner LLP

(57) ABSTRACT

In various examples, a fluid ejection device may include a fluid ejection die formed with a first material and that includes a bondpad and a plurality of fluid ejectors, and a cover layer adjacent the fluid ejection die. The cover may be formed with a second material that is different than the first material and may include a first region that overlays the bondpad and a second region that overlays the plurality of fluid ejectors. In various examples, the first and second regions are separated by a break in the cover layer. The break may be filled with a third material that is different than one or both of the first and second material.

20 Claims, 8 Drawing Sheets

(56) References Cited

U.S. PATENT DOCUMENTS

| | | | |
|---|---|---|---|
| 2011/0025780 | A1 | 2/2011 | Panchawagh et al. |
| 2017/0028722 | A1* | 2/2017 | Chen .................... B41J 2/04541 |

FOREIGN PATENT DOCUMENTS

| | | | |
|---|---|---|---|
| CN | 105142908 | A | 12/2015 |
| CN | 105793044 | A | 7/2016 |
| CN | 105934347 | A | 9/2016 |
| CN | 107073962 | A | 8/2017 |
| JP | 09-001812 | A | 1/1997 |
| JP | 2002-079675 | A | 3/2002 |
| JP | 2002-331667 | A | 11/2002 |
| JP | 2006-026950 | A | 2/2006 |
| JP | 2006-297827 | A | 11/2006 |
| JP | 2007-055071 | A | 3/2007 |
| JP | 2008-006812 | A | 1/2008 |
| JP | 2009-255448 | A | 11/2009 |
| JP | 2012-030400 | A | 2/2012 |
| JP | 2014-069353 | A | 4/2014 |
| JP | 2015-223832 | A | 12/2015 |
| JP | 2016-508461 | A | 3/2016 |
| JP | 2016-078289 | A | 5/2016 |
| JP | 2016-515055 | A | 5/2016 |
| JP | 2017-525599 | A | 9/2017 |
| JP | 2018-202806 | A | 12/2018 |
| TW | 201612018 | A | 4/2016 |
| WO | 2009/018316 | A1 | 2/2009 |
| WO | 2014/133660 | A1 | 9/2014 |
| WO | 2016/186603 | A1 | 11/2016 |
| WO | 2017/078661 | A1 | 5/2017 |

* cited by examiner

604

FLUID EJECTION DEVICE WITH BREAK(S) IN COVER LAYER

CROSS-REFERENCE TO RELATED PATENT APPLICATIONS

This application is a continuation patent application that claims priority under 35 U.S.C. § 120 to U.S. patent application Ser. No. 17/311,593, filed Jun. 7, 2021, which is a U.S. National Stage Entry under 35 U.S.C. § 371 of International Application No. PCT/US2019/029620, filed Apr. 29, 2019, the contents of all such applications being hereby incorporated by reference in their entirety and for all purposes as if completely and fully set forth herein.

BACKGROUND

Fluid ejection devices such as printing fluid printheads may undergo considerable mechanical stresses at various stages of their lifetimes. If left unmitigated these mechanical stresses may shorten a lifetime of a fluid ejection device. For example, during manufacture a fluid ejection device may be exposed to relatively high temperatures. Different components of the fluid ejection device may be constructed with different materials that have varying coefficients of thermal expansion ("CTE"). Consequently, each component may exhibit a different physical reaction to the heat. These varying physical reactions may cause various abnormalities and/or defects, which in some cases may expose sensitive components such as bondpads to fluids such as epoxy and/or printing fluids. Also, the process of encapsulating wires connecting bondpads of fluid ejection die to other logic components may induce considerable stress to portions of the fluid ejection device. Additionally, during use, the ejection of fluid may impose competing forces on various components of the fluid ejection device, which can lead to further defects and/or shortening of the fluid ejection device's lifespan.

BRIEF DESCRIPTION OF THE DRAWINGS

Features of the present disclosure are illustrated by way of example and not limited in the following figure(s), in which like numerals indicate like elements.

DETAILED DESCRIPTION

Figure 1:
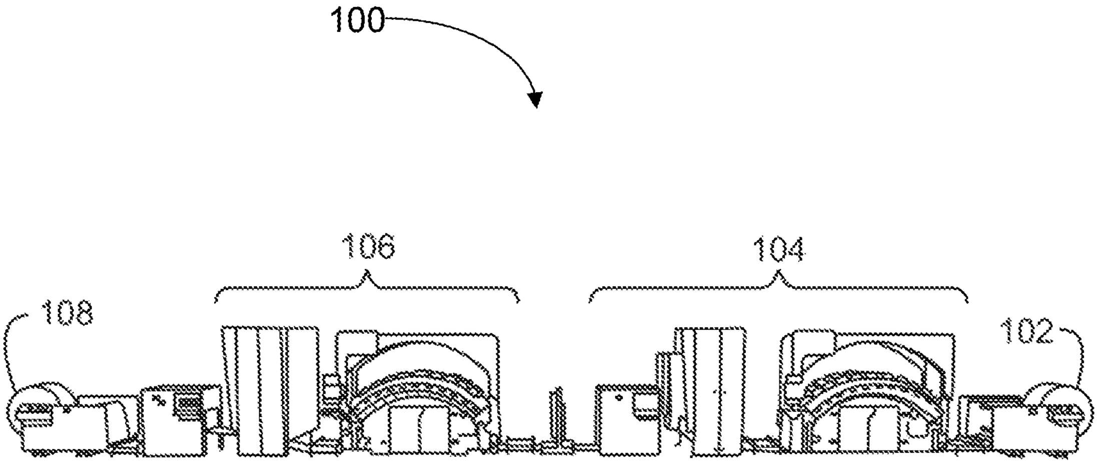
FIG. 1 is a drawing of an example printing press that uses fluid ejection devices to form images on a print medium.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, it should be understood that the elements depicted in the accompanying figures may include additional components and that some of the components described in those figures may be removed and/or modified without departing from scopes of the elements disclosed herein. It should also be understood that the elements depicted in the figures may not be drawn to scale and thus, the elements may have different sizes and/or configurations other than as shown in the figures.

Techniques, apparatus such as fluid ejection devices and printbars, and systems such as printing systems are described herein that include break(s) between regions of a cover layer that overlays a fluid ejection die. These breaks between the various regions or portions of the cover layer may mitigate the mechanical stress(es) outlined previously, and thereby may result in an increased fluid ejection device lifespan. In some examples, the cover layer may be formed with photoresist materials such as SU-8. The fluid ejection die may take various forms as well, such as a silicon-based die sliver that is used as a printhead die.

A "bondpad protection" region or portion of the cover layer may be designed to overlay, and thereby protect from fluids such as ink, bondpad(s) of the underlying fluid ejection die. This area of the fluid ejection device is referred to herein as the "encapsulation area" because it is the area in which a wire connecting the bond pad(s) to an outside logic component is encapsulated with various materials in order to protect an electrical connection between the fluid ejection die and the outside logic component. In some examples, a fluid ejection device may include two encapsulation areas at opposite ends of its length.

An "orifice" region or portion of the cover layer may be designed to overlay a plurality of fluid ejectors of the fluid ejection die. For example, the orifice region of the cover lay may be formed with a plurality of nozzles that fluidly couple the plurality of fluid ejectors with an exterior of the fluid ejection device, e.g., so that ejected fluid droplets may reach their intended target. This overall area of the fluid ejection device is referred to herein as the "fluid ejection area." In some examples, the fluid ejection area may lie in between two flanking encapsulation areas of the fluid ejection device.

If the cover layer takes the form of a continuous layer without any breaks, many of the mechanical stresses imparted on some components of the fluid ejection device during its lifetime may impact other components, thereby causing various defects and/or abnormalities. For example, fissures or gaps may form between various components, which may impact the overall mechanical stability of the fluid ejection device. Moreover, fluid such as ink may enter these fissures or gaps, e.g., via capillary wicking. This fluid may come into contact with components such as bondpads, causing electrical failure, and may also cause and/or accelerate corrosion of various components.

Accordingly, break(s) may be formed in the cover layer, e.g., between the bondpad protection and orifice regions. These breaks may then be filled with material such as polymers and/or epoxy mold compound ("EMC"). By having such EMC-filled breaks, the stresses imparted on some components of the fluid ejection device may be mitigated or eliminated from impacting other components. As a non-limiting example, the fluid ejection area of the fluid ejection device may be isolated from stresses induced in the encapsulation area of the fluid ejection device during manufacture. In addition, material seams along the surface of the device, e.g., beneath the EMC encapsulant, are removed, thereby eliminating the potential for ink wicking along a seam underneath the encapsulant.

These cover layer breaks may take various forms. In some examples, the cover layer may include a plurality of sublayers, such as a prime layer, a chamber layer, and a "top hat" layer. In some such examples, the breaks may be formed in all or a subset of these layers. For example, the prime layer that is nearest the fluid ejection die may be left intact, while the breaks may be formed in the chamber and top hat layers. Also, in some examples the bondpad protection region of the cover layer may include a wall or "hedgerow" that surrounds the bondpad(s), further preventing fluid from contacting the bondpads, especially after the wire connecting the bondpad (s) to the outside logic component is encapsulated.

FIG. 1 is a drawing of an example of a printing press 100 that uses ink jet printheads to form images on a print medium. The printing press 100 can feed a continuous sheet of a print medium from a large roll 102. The print medium can be fed through a number of printing systems, such as printing system 104. In the printing system 104 a printbar that houses a number of printheads ejects ink droplets onto the print medium. A second printing system 106 may be used to print additional colors. For example, the first system 104 may print black, while the second system 106 may print cyan, magenta, and yellow (CMY).

The printing systems 104 and 106 are not limited to two, or the mentioned color combinations, as any number of systems may be used, depending, for example, on the colors desired and the speed of the printing press 100. More generally, techniques described herein are not limited to printing presses such as that depicted in FIG. 1. Techniques described herein can be implemented in a wide variety of scenarios, such as in desktop printers, end-of-aisle printers, a printhead with a single die, thermal inject printers, piezo inkjet printers, etc. Moreover, techniques described herein may apply to systems with a fixed printhead and/or printbar and moving media, and/or to systems with scanning printheads and/or bars. In addition, techniques described herein are applicable with both two-dimensional ("2D") and three-dimensional ("3D") printers.

After the second system 106, the printed print medium may be taken up on a take-up roll 108 for later processing. In some examples, other units may replace the take-up roll 108, such as a sheet cutter and binder, among others.

Figure 2:
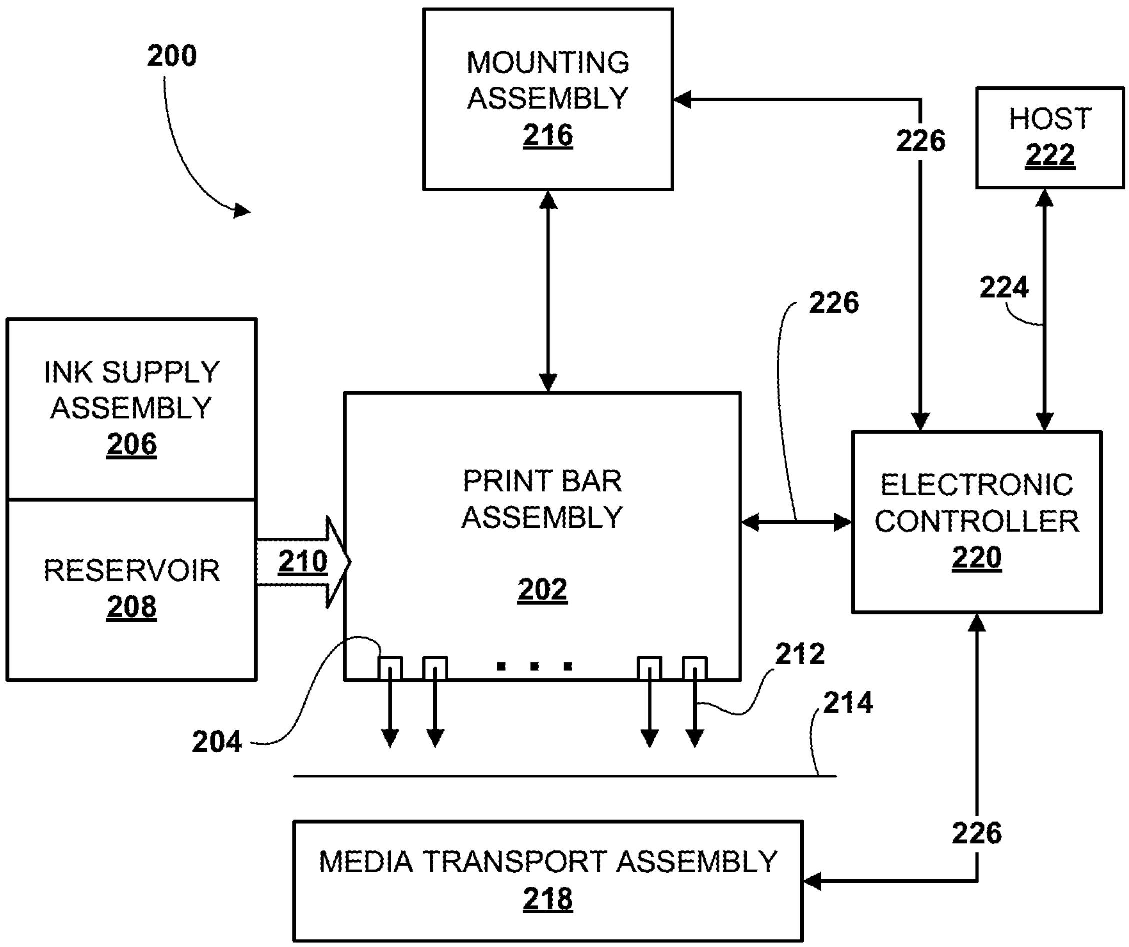
FIG. 2 is a block diagram of an example of a fluid ejection system that may be used to form images using fluid ejection devices.

FIG. 2 is a block diagram of an example of an ink jet printing system 200 that may be used to form images using ink jet printheads. The ink jet printing system 200 includes a printbar 202, which includes a number of printheads 204, and an ink supply assembly 206. The ink supply assembly 206 includes an ink reservoir 208. From the ink reservoir 208, ink 210 is provided to the printbar 202 to be fed to the printheads 204. The ink supply assembly 206 and printbar 202 may use a one-way ink delivery system or a recirculating ink delivery system. In a one-way ink delivery system, substantially all of the ink supplied to the printbar 202 is consumed during printing. In a recirculating ink delivery system, a portion of the ink 210 supplied to the printbar 202 is consumed during printing, and another portion of the ink is returned to ink supply assembly. In an example, the ink supply assembly 206 is separate from the printbar 202, and supplies the ink 210 to the printbar 202 through a tubular connection, such as a supply tube (not shown). In other examples, the printbar 202 may include the ink supply assembly 206, and ink reservoir 208, along with a printhead 204, for example, in single user printers. In either example, the ink reservoir 208 of the ink supply assembly 206 may be removed and replaced, or refilled.

From the printheads 204 the ink 210 is ejected from nozzles as ink droplets 212 towards a print medium 214, such as paper, Mylar, cardstock, and the like. The nozzles of the printheads 204 are arranged in columns or arrays such that properly sequenced ejection of ink 210 can form characters, symbols, graphics, or other images to be printed on the print medium 214 as the printbar 202 and print medium 214 are moved relative to each other. The ink 210 is not limited to colored liquids used to form visible images on a print medium, for example, the ink 210 may be an electroactive substance used to print circuit patterns, such as solar cells.

A mounting structure or assembly 216 may be used to position the printbar 202 relative to the print medium 214. In an example, the mounting assembly 216 may be in a fixed position, holding a number of printheads 204 above the print medium 214. In another example, the mounting assembly 216 may include a motor that moves the printbar 202 back and forth across the print medium 214, for example, if the printbar 202 included one to four printheads 204. A media transport assembly 218 moves the print medium 214 relative to the printbar, for example, moving the print medium 214 perpendicular to the printbar 202. In the example of FIG. 1, the media transport assembly 218 may include the rolls 102 and 108, as well as any number of motorized pinch rolls used to pull the print medium through the printing systems 104 and 106. If the printbar 202 is moved, the media transport assembly 218 may index the print medium 214 to new positions. In examples in which the printbar 202 is not moved, the motion of the print medium 214 may be continuous.

A controller 220 receives data from a host system 222, such as a computer. The data may be transmitted over a network connection 224, which may be an electrical connection, an optical fiber connection, or a wireless connection, among others. The data transmitted over network connection 224 may include a document or file to be printed, or may include more elemental items, such as a color plane of a document or a rasterized document. The controller 220 may temporarily store the data in a local memory for analysis. The analysis may include determining timing control for the ejection of ink drops from the printheads 204, as well as the motion of the print medium 214 and any motion of the printbar 202. The controller 220 may operate the individual parts of the printing system over control lines 226. Accordingly, the controller 220 defines a pattern of ejected ink drops 212 which form characters, symbols, graphics, or other images on the print medium 214.

The ink jet printing system 200 is not limited to the items shown in FIG. 2. For example, the controller 220 may be a cluster computing system coupled in a network that has separate computing controls for individual parts of the system. For example, a separate controller may be associated with each of the mounting assembly 216, the printbar 202, the ink supply assembly 206, and the media transport assembly 218. In this example, the control lines 226 may be network connections coupling the separate controllers into a single network. In other example, the mounting assembly 216 may not be a separate item from the printbar 202, for example, if no motion is needed by the printbar 202.

Figure 3:
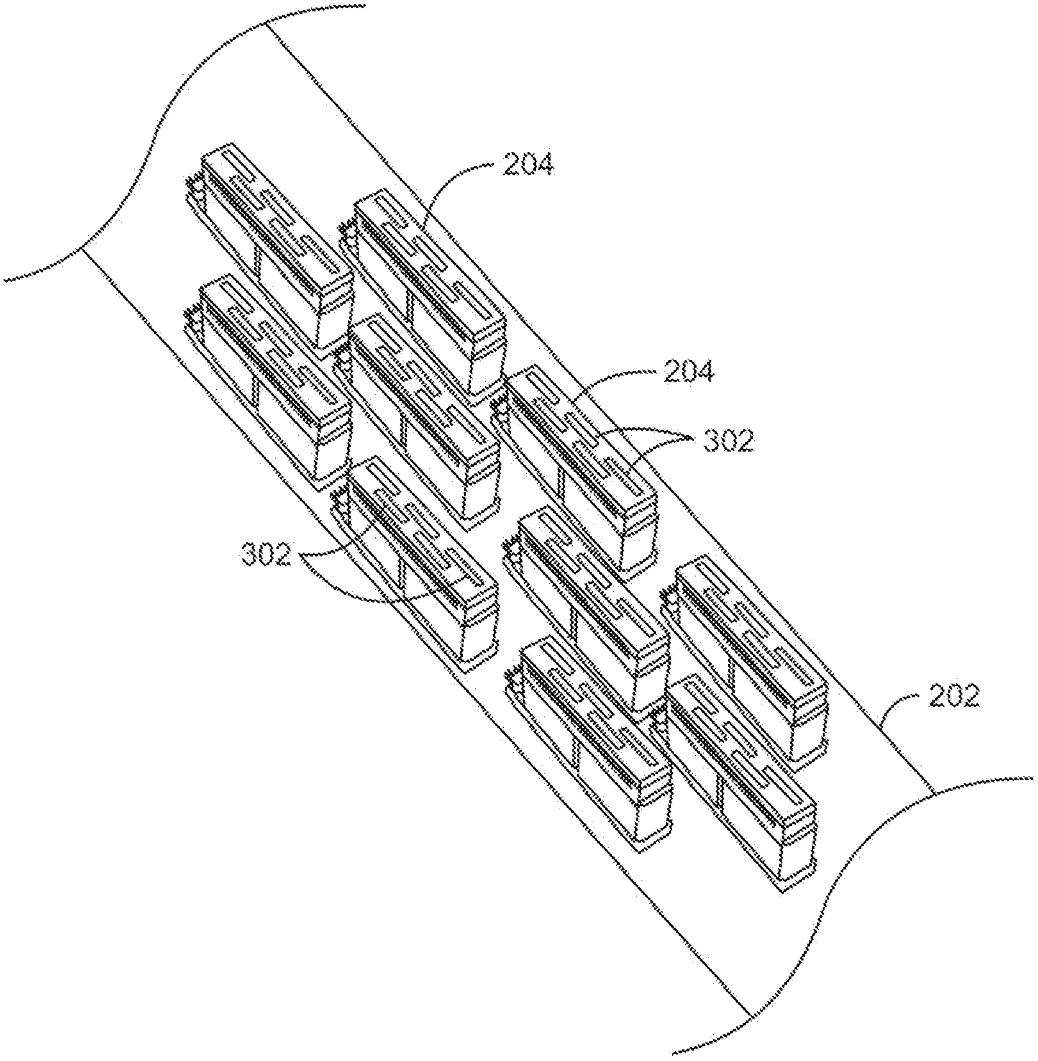
FIG. 3 is a drawing of a cluster of fluid ejection devices in the form of ink jet printheads in an example print configuration, for example, in a printbar.

FIG. 3 is a drawing of a cluster of ink jet printheads 204 in an example print configuration, for example, in a printbar 202. Like numbered items are as described with respect to FIG. 2. The printbar 202 shown in FIG. 3 may be used in configurations that do not move the printhead. Accordingly, the printheads 204 may be attached to the printbar 202 in an overlapping configuration to give complete coverage. Each printhead 204 has multiple nozzle regions 302 that have the nozzles and circuitry used to eject ink droplets. In some cases, nozzle regions 302 may take the form of silicon-based fluid ejection dies as described herein.

Figure 4:
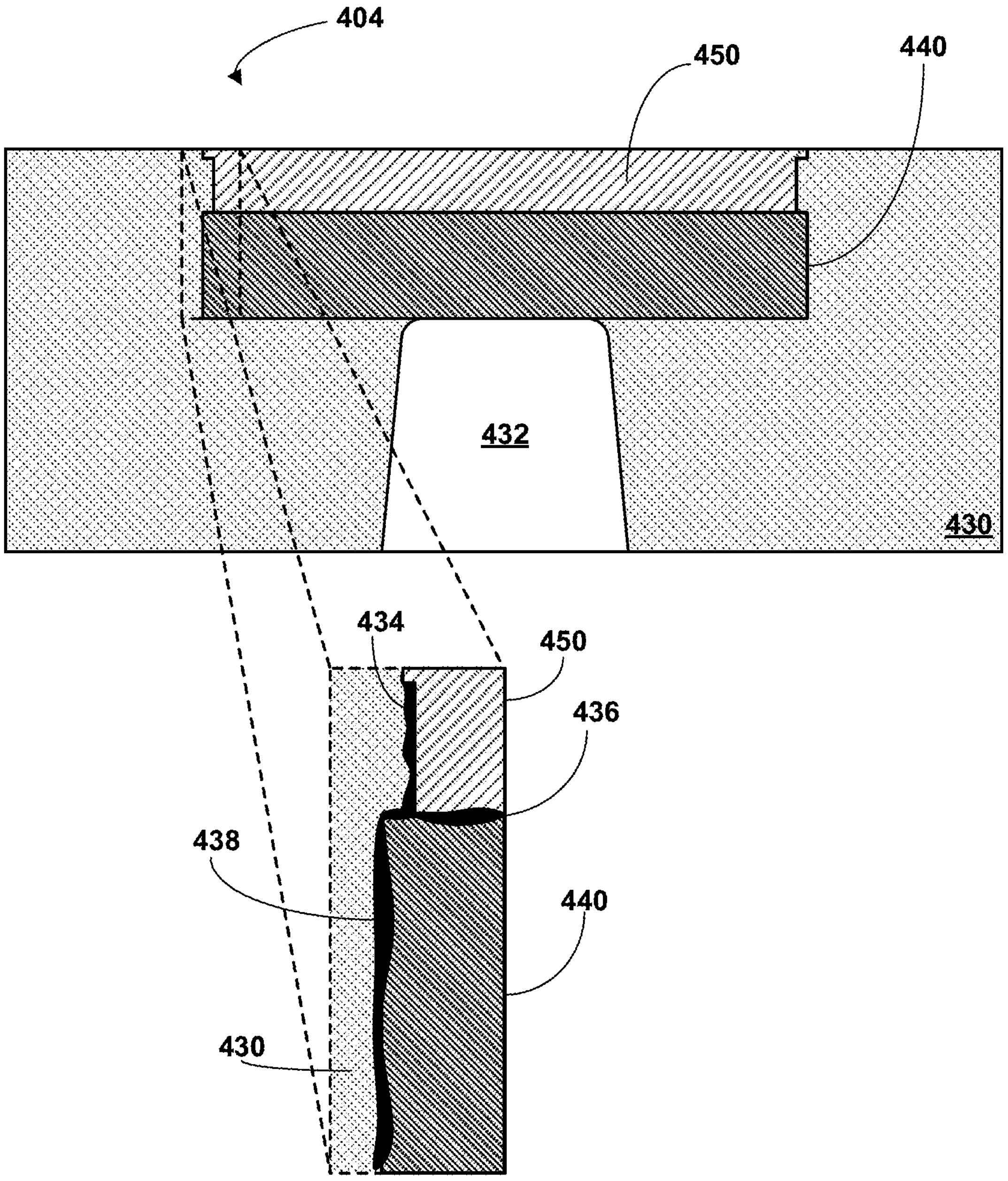
FIG. 4 demonstrates how thermal and/or mechanical stresses may introduce defects along various interfaces, such as thin film interfaces, within a fluid ejection device.

FIG. 4 depicts a fluid ejection device 404, which may correspond to a printhead 204 of previous figures. Fluid ejection device 404 is viewed in FIG. 4 along its longitudinal axis. Fluid ejection device 404 includes a fluid ejection die 440 fluidly coupled to a fluid chamber 432 and a cover layer 450. Fluid ejection die 440 may take various forms, such as a relatively thin and narrow printhead die sometimes referred to as a printhead die "sliver." Fluid ejection die 440 may be constructed with various materials, such as silicon. Although not visible in FIG. 4, in various examples, fluid ejection die 440 may include various components that facilitate ejection of fluid such as ink for printing, such as ejection devices, bondpads to electrically connect fluid ejection die 440 to, for instance, electronic controller 220 and/or host 222, and so forth.

Cover layer 450 is disposed adjacent fluid ejection die 440, e.g., on a top surface of fluid ejection die 440. Cover layer 450 may be constructed with different material(s) than fluid ejection die 440. This may result in cover layer 450 having a different coefficient of thermal expansion ("CTE") than fluid ejection die 440, as described previously. In some examples, cover layer 450 may be constructed with a photoresist material, such as SU-8.

Fluid ejection die 440 and cover layer 450 may be embedded or otherwise disposed in/on a molding 430. Molding 430 may be constructed with different material(s) than fluid ejection die 440 and/or cover layer 450. In some examples, molding 430 is constructed with EMC. In some examples, the EMC used to construct molding 430 may include spherical filler material made of, for instance, silica.

At bottom of FIG. 4 is a blown up portion of fluid ejection device 404 captured at an interface between molding 430, fluid ejection die 440, and cover layer 450. As a consequence of the various mechanical and/or thermal stresses experienced by and/or imparted on fluid ejection device 404 during its lifetime, various gaps 434-438 have formed at various interfaces between various components. For example, a first gap 434 has formed between cover layer 450 and molding 430. A second gap 436 has formed between cover layer 450 and fluid ejection die 440. A third gap 438 has formed between molding 430 and fluid ejection die 440.

Fluid such as ink may tend to seep into any of these gaps, e.g., by way of capillary wicking. This may result in significant shortening of fluid ejection device lifespan, corrosion, and/or in some instances may cause failure of fluid ejection device 404, e.g., where ink or other moisture comes into contact with bondpad(s) of fluid ejection die 440. Accordingly, and as described previously, break(s) may be incorporated into various components, such as cover layer 450, to mitigate the mechanical and/or thermal stresses described previously and prolong the lifespan of fluid ejection device 404.

Figure 5A:
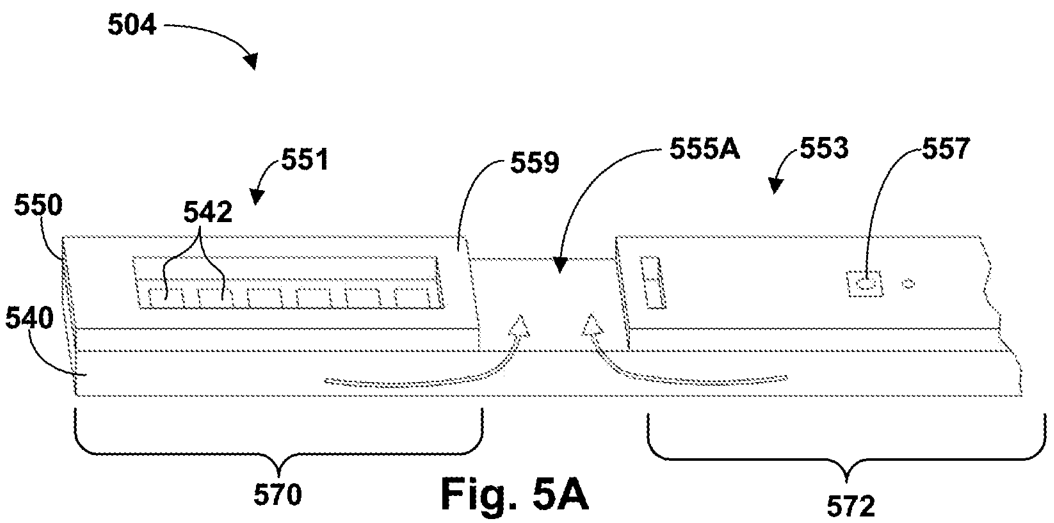
FIGS. 5A and 5B depict an example of how a fluid ejection device configured with selected aspects of the present disclosure may be assembled.
Figure 5B:
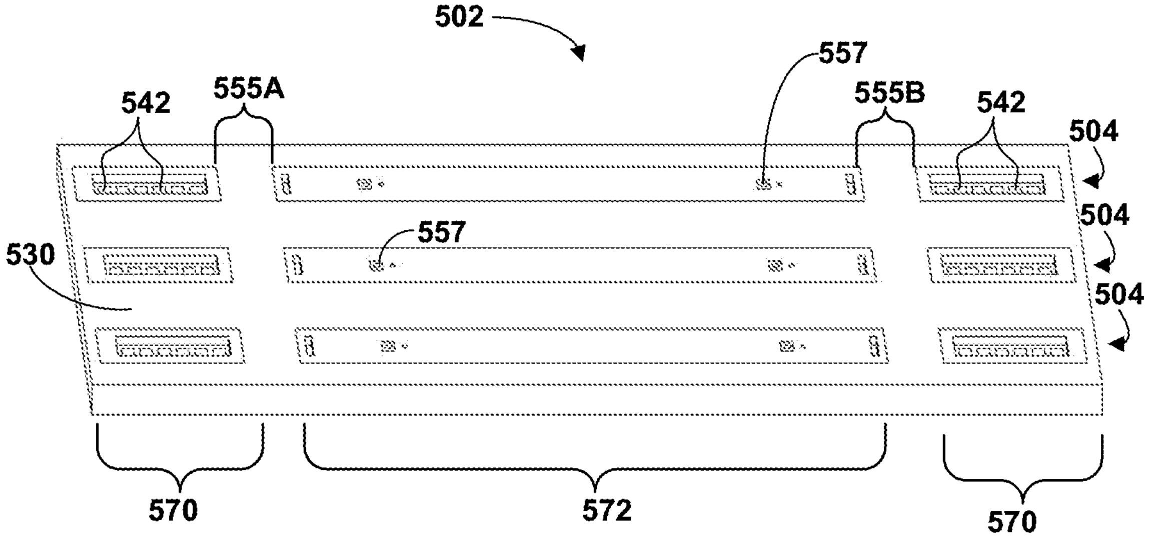

FIGS. 5A-B depict one example of how techniques described herein may be used to introduce gap(s) or break(s) into various components of a fluid ejection device 504. In FIG. 5A, a single fluid ejection device 504 is depicted prior to being molded with, for instance, EMC. In FIG. 5A, fluid ejection die 540 and cover layer 550 are visible.

A "bondpad protection" region or portion 551 of cover layer 550 may be designed to overlay, and thereby protect from fluids such as ink, bondpad(s) 542 of underlying fluid ejection die 440. This overall area 570 of fluid ejection device 504 is referred to herein as the "encapsulation area" because it is the area in which a wire connecting bond pad(s) 542 to an outside logic component, e.g., electronic controller 220 and/or host 222, is encapsulated with various materials in order to protect an electrical connection between the fluid ejection die and the outside logic component.

In FIG. 5A, bondpad protection region 551 includes a wall 559, or "hedgerow," formed with the same material as cover layer 550. Wall 559 surrounds and prevents fluid from contacting bondpad(s) 542. For example, when a molding compound such as EMC is introduced, wall 559 may prevent the molding compound from contacting bondpad(s) 542.

An "orifice" region or portion 553 of cover layer 550 may be designed to overlay a plurality of fluid ejectors (not visible in FIG. 5A) of fluid ejection die 540. For example, the orifice region 553 may be formed with a plurality of nozzles (with one nozzle 557 depicted in FIG. 5A) that fluidly couple the plurality of fluid ejectors with an exterior of fluid ejection device 504. This overall area 572 of fluid ejection device 504 is referred to herein as the "fluid ejection area." In some examples, fluid ejection area 572 may lie in between two flanking encapsulation areas 570 of fluid ejection device 504.

In FIG. 5A a single break 555A is visible in cover layer 550. Break 555A is formed between a respective bondpad protection region 551 and orifice region 553, and therefore separates fluid ejection area 572 from a respective encapsulation area 570 of fluid ejection device 504.

FIG. 5B depicts multiple fluid ejection devices 504 formed on a molding 530 after the molding material (e.g., EMC) has set. In particular, FIG. 5B depicts how molding material such as EMC has been used to fill in, among other things, breaks 555A and 555B of each of three fluid ejection devices 504. In the example of FIG. 5B, three fluid ejection devices 504 are depicted as part of a printbar 502. However, this is not meant to be limiting, and any number of fluid ejection devices 504 may be arranged in the same way as in FIG. 5B or in a different way, e.g., similar to FIG. 3.

Once each break 555A, 555B is filled with EMC, the EMC may, in effect, decouple the stressful interaction between encapsulation area(s) 570 and fluid ejection area 572. EMC in general may have a lesser CTE than cover layer 550, and may be better matched to silicon. Consequently, the lifespan of fluid ejection device 504 may be increased because the growth and formation of gaps and cracks, such as 434-438 in FIG. 4, may be diminished or avoided altogether.

Figure 6A:
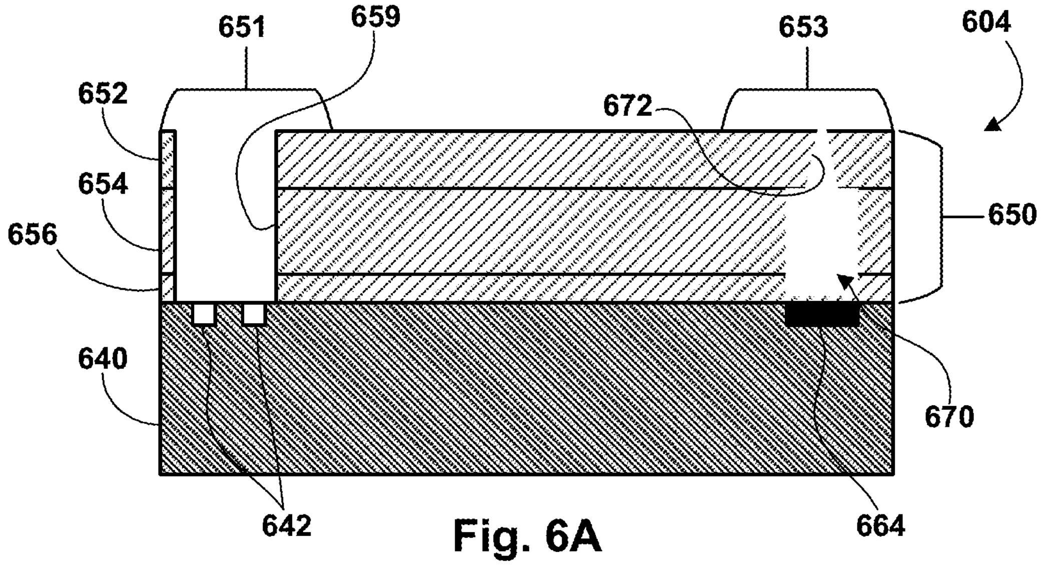
FIGS. 6A, 6B, 6C, and 6D depict another example of how a fluid ejection device configured with selected aspects of the present disclosure may be assembled.

FIGS. 6A-D schematically depict, in cross section, one example of how a fluid ejection device configured with selected aspects of the present disclosure may be assembled, in accordance with various examples. In FIG. 6A, one side of a fluid ejection device 604 is depicted as a first stage of assembly. A cover layer 650 has been attached to a fluid ejection die 640, e.g., using adhesive or other techniques. Also, a fluid chamber 670 and nozzle 672 have been formed in cover layer 650. While a single fluid chamber 670/nozzle 672 are depicted, in various examples, likely multiple nozzles and fluid chambers would be present. Fluid ejection die 640 also includes fluid ejector 664 that may be actuated to eject fluid from fluid chamber 670 through nozzle 672.

Fluid ejector 664 may take various forms, such as thermal elements (e.g., resistors) and/or piezoelectric elements.

Figure 6B:
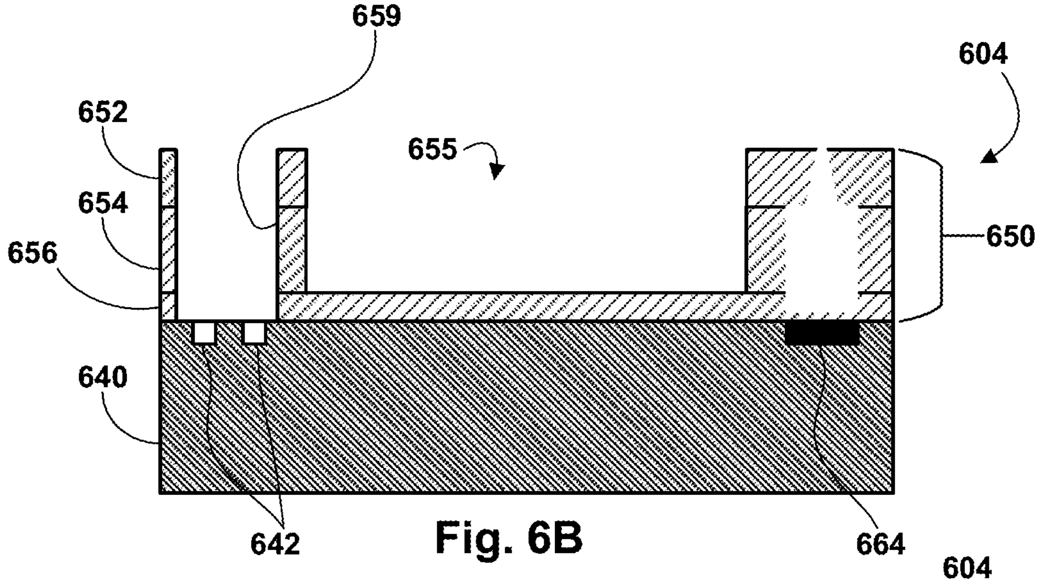
Figure 6C:
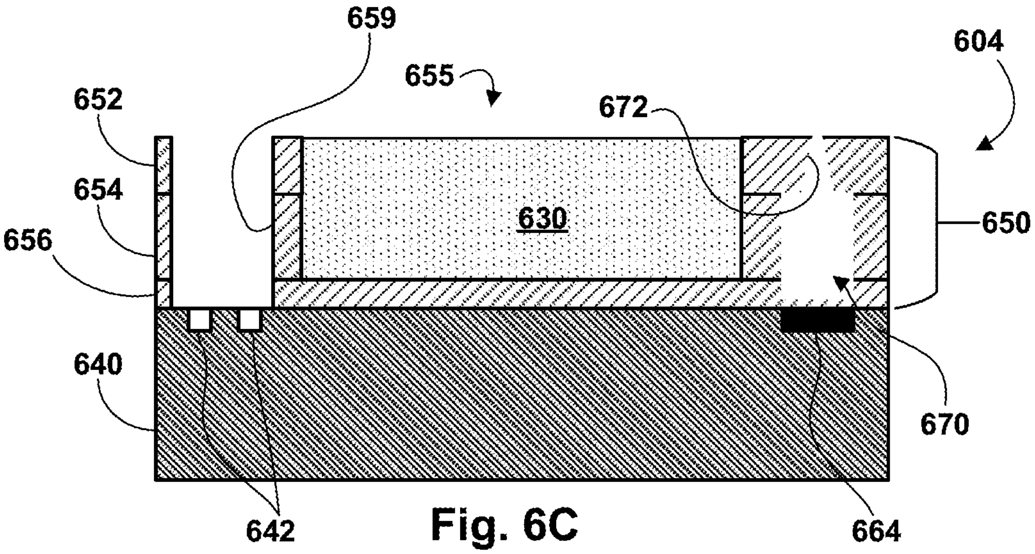

Fluid ejection die 640 also includes bondpads 642 that can be used to electrically connect fluid ejection die 640 to a remote logic device, such as electronic controller 220. In FIGS. 6A-C, bondpads 642 are exposed from the top, and yet are protected from fluid in part by wall or "hedgerow" 659, which may correspond to wall 559 in FIGS. 5A-B. While two bondpads 642 and one fluid ejector 664 are depicted in FIGS. 6A-D, this is not meant to be limiting. Fluid ejection die 640 may include any number of bondpads 642 and fluid ejectors 664.

As indicated in FIG. 6A, cover layer 650 includes a bondpad protection region 651 and an orifice region 653. These regions overlay, respectively, bondpads 642 and nozzle 672/fluid chamber 670. Cover layer 650 also includes multiple sublayers 652-656. In this example, the multiple sublayers may include a "top hat" sublayer 652, a "chamber" sublayer 654, and a "prime" sublayer 656. Other configurations are possible.

Figure 6D:
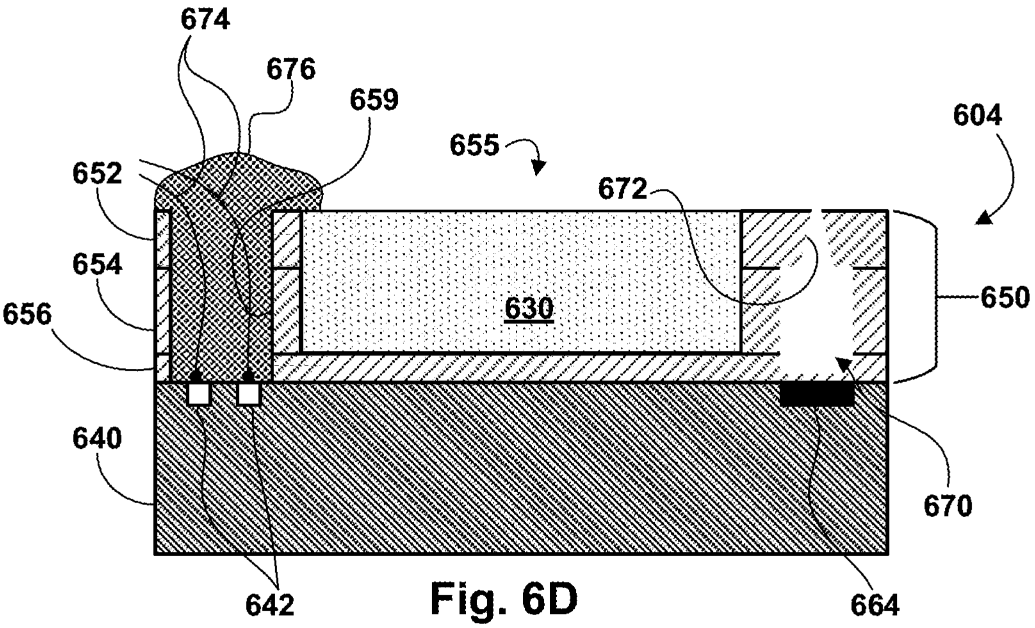

In FIG. 6B, a break 655 has been formed in cover layer 650. In the example of FIGS. 6B-D, break 655 is formed through top hat sublayer 652 and chamber sublayer 654, but not through prime sublayer 656. However, this is not meant to be limiting. In other examples, break 655 may be formed through all three layers, through top hat layer 652, etc.

Break 655 may be formed in various ways. In some examples, break 655 is formed using techniques such as etching. In other examples in which cover layer 650 is formed with a photoresist material, break 655 may be formed using a positive or negative photoresist process. In some examples, break 655 may be formed after a continuous layer of SU-8 is applied to a surface of fluid ejection die 640, e.g., by applying a mask (not depicted) to the continuous layer of SU-8. The mask may be shaped to allow light to pass to a first part of the continuous layer of SU-8 and to block light from reaching a second part of the continuous layer of SU-8. Then, light may be directed towards the mask/die 640 to cause portions of cover layer 650 to cross-link, for example negative-acting SU8 material. A solvent may be used to wash these degraded portions away, leaving the un-degraded portions intact.

In FIG. 6C, a molding material such as EMC has been flowed through break 655 to form molding 630. As noted previously, positioning molding 630 between bondpad protection region 651 and orifice region 653 may isolate various stresses imparted on various components of fluid ejection device 604 during its lifetime, e.g., so that those stresses are not imparted on other components to cause any of the defect(s) evident in FIG. 4. Before the EMC has set and is still in liquid form, wall 659 protects bondpads 642 from exposure to EMC.

In FIG. 6D, wires 674 have been coupled to bondpads 642. As noted previously, wires 674 may lead to a remote logic, such as electronic controller 220 in FIG. 2. An encapsulant 676 has be deposited over wires 674 in the recess formed by wall 659, in order to protect the electrical connection. Although depicted in a different fill pattern in FIG. 6D, in some examples, encapsulant 676 may be formed using the same material, e.g., EMC, as molding 630.

Figure 7:
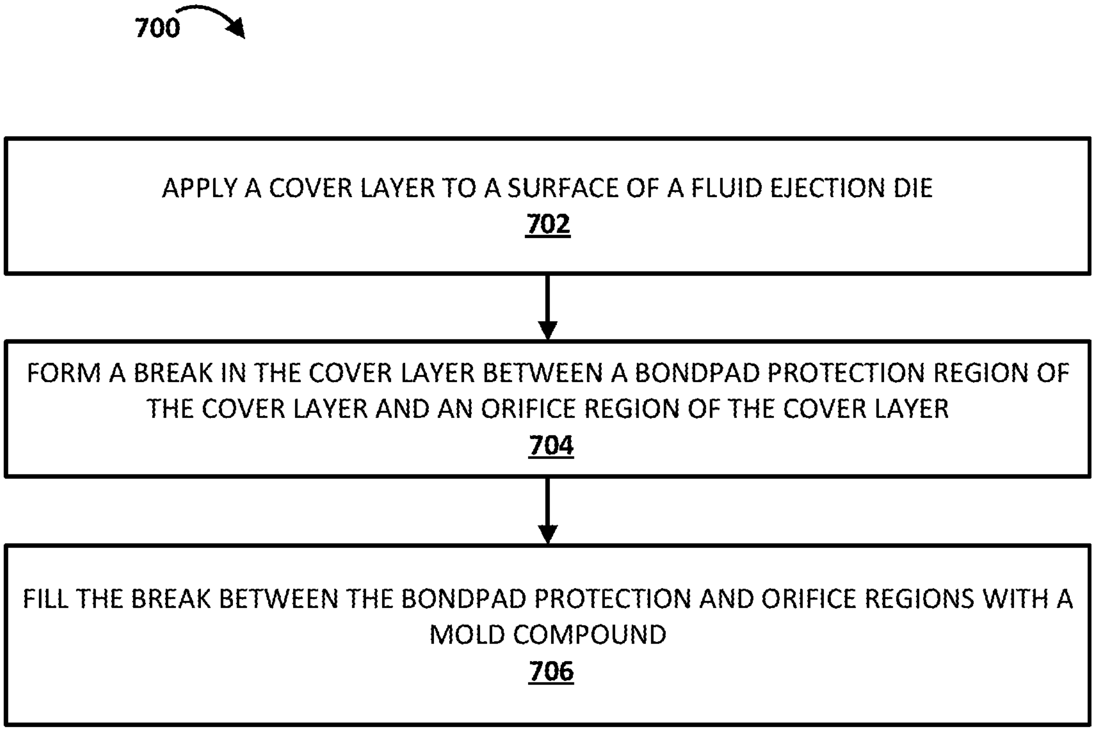
FIG. 7 depicts an example method of assembling a fluid ejection device configured with selected aspects of the present disclosure.

FIG. 7 illustrates a flowchart of an example method 700 for constructing a fluid ejection device configured with selected aspects of the present disclosure. Other implementations may include additional operations than those illustrated in FIG. 7, may perform operations (s) of FIG. 7 in a different order and/or in parallel, and/or may omit various operations of FIG. 7.

At block 702, a cover layer may be applied to a surface of a fluid ejection die so that a bondpad protection region of the cover layer overlays a bondpad of the fluid ejection die and an orifice region of the cover layer overlays a plurality of fluid ejectors of the fluid ejection die. An example result of these operations is depicted in FIG. 6A.

At block 704, a break may be formed in the cover layer between the bondpad protection and orifice regions of the cover layer. An example result of these operations is depicted in FIG. 6B. As noted previously, the break may be formed using various techniques, such as etching, photoresist manipulation, and so forth. At block 706, the break between the bondpad protection and orifice regions of the cover layer may be filled with a plastic or other mold compound such as EMC. An example result of these operations is depicted in FIG. 6C.

In some examples, the cover layer may be constructed with photoresist material such as SU-8. In some such examples, the operations of block 702 and/or 704 may include, for instance, applying a continuous layer of SU-8 to the surface of the fluid ejection die, and applying a mask to the continuous layer of SU-8. In various examples, the mask may be shaped to allow light to pass to a first part of the continuous layer of SU-8. In examples in which the cover layer is constructed with a negative photoresist, this may cause the first part of the continuous layer of SU-8 to become strengthened (or degraded in the case of positive photoresist examples). The mask may block light from reaching a second part of the continuous layer of SU-8, e.g., so that the second part becomes degraded (or strengthened in the case of positive photoresist examples).

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A fluid ejection device, comprising:
- a fluid ejection die comprising a first bondpad, a second bondpad, and a plurality of fluid ejectors; and
- a cover layer adjacent to the fluid ejection die, the cover layer comprising:
  - a first region to encapsulate the first bondpad;
  - a second region comprising a plurality of nozzles to couple the plurality of fluid ejectors with an exterior of the fluid ejection device;
  - a third region to encapsulate the second bondpad;
  - a first break in the cover layer between the first region and the second region; and
  - a second break in the cover layer between the second region and the third region.

2. The fluid ejection device of claim 1, wherein the first region comprises a wall that surrounds the first bondpad to prevent fluid from contacting the first bondpad.

3. The fluid ejection device of claim 1, wherein the second region comprises a wall that surrounds the second bondpad to prevent fluid from contacting the second bondpad.

4. The fluid ejection device of claim 1, wherein the fluid ejection die comprises a first material and the cover layer comprises a second material different from the first material.

5. The fluid ejection device of claim 1, further comprising a molding material to fill in the first break and the second break.

6. The fluid ejection device of claim 5, wherein the molding material comprises a first material that is different from a second material of the fluid ejection die and a third material of the cover layer.

7. The fluid ejection device of claim 6, wherein the first material comprises an epoxy mold compound.

8. The fluid ejection device of claim 6, wherein the second material comprises silicon.

9. The fluid ejection device of claim 6, wherein the third material comprises SU-8.

10. The fluid ejection device of claim 6, wherein the first material has a lower coefficient of thermal expansion than the third material.

11. The fluid ejection device of claim 6, wherein the second material has a different coefficient of thermal expansion than the third material.

12. The fluid ejection device of claim 1, wherein the cover layer comprises a plurality of sublayers comprising at least a first layer, a second layer, and a third layer, and wherein the first break and the second break are each formed in at least one of the first layer, the second layer, or the third layer.

13. The fluid ejection device of claim 12, wherein each of the first break and second break is formed in the first layer and the second layer.

14. A printbar comprising:
- a plurality of fluid ejection devices, each of the plurality of fluid ejection devices comprising:
  - a fluid ejection die comprising a first bondpad, a second bondpad, and a plurality of fluid ejectors; and
  - a cover layer adjacent to the fluid ejection die, the cover layer comprising:
    - a first region to encapsulate the first bondpad;
    - a second region comprising a plurality of nozzles to couple the plurality of fluid ejectors with an exterior of the fluid ejection device;
    - a third region to encapsulate the second bondpad;
    - a first break in the cover layer between the first region and the second region; and
    - a second break in the cover layer between the second region and the third region.

15. The printbar of claim 14, wherein each of the plurality of fluid ejection devices further comprises a molding material to fill in the first break and the second break.

16. The printbar of claim 15, wherein the fluid ejection die comprises a first material, the cover layer comprises a second material different from the first material, and the molding material comprises a third material different from the first material and the second material.

17. The printbar of claim 16, wherein a coefficient of thermal expansion for each of the first material, the second material, and the third material is different from each other.

18. A printing system comprising:
- a reservoir to store printing fluid; and
- a printbar comprising a plurality of fluid ejection devices, each of the plurality of fluid ejection devices comprising:
  - a fluid ejection die comprising a first bondpad, a second bondpad, and a plurality of fluid ejectors to receive the printing fluid from the reservoir; and
  - a cover layer adjacent to the fluid ejection die, the cover layer comprising:
    - a first region to encapsulate the first bondpad;
    - a second region comprising a plurality of nozzles to dispense the printing fluid through the plurality of fluid ejectors to a printing medium;
    - a third region to encapsulate the second bondpad;
    - a first break in the cover layer between the first region and the second region; and
    - a second break in the cover layer between the second region and the third region.

19. The printing system of claim 18, wherein the plurality of fluid ejection devices are arranged in one or more columns to dispense the printing fluid in a particular sequence.

20. The printing system of claim 18, wherein the fluid ejection die comprises a first material, the cover layer comprises a second material different from the first material, and a molding material that fills in the first break and the second break comprises a third material different from the first material and the second material.

* * * * *